A. L. HASTINGS.
TRUCK FRAME.
APPLICATION FILED NOV. 28, 1910.
1,006,549.
Patented Oct. 24, 1911.
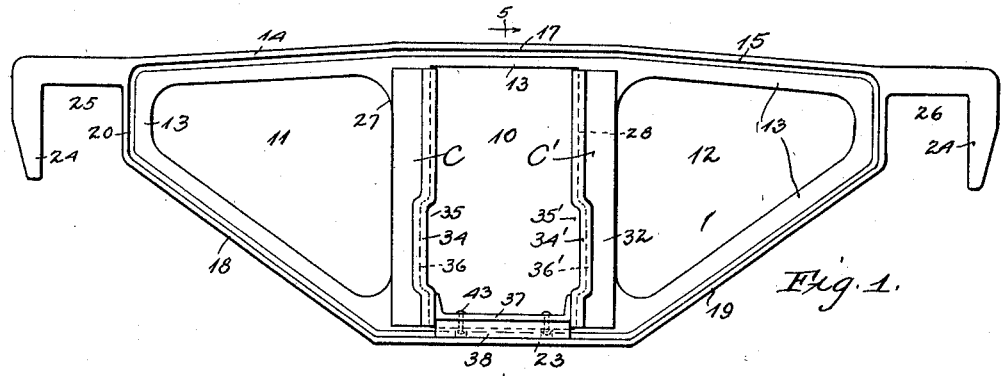
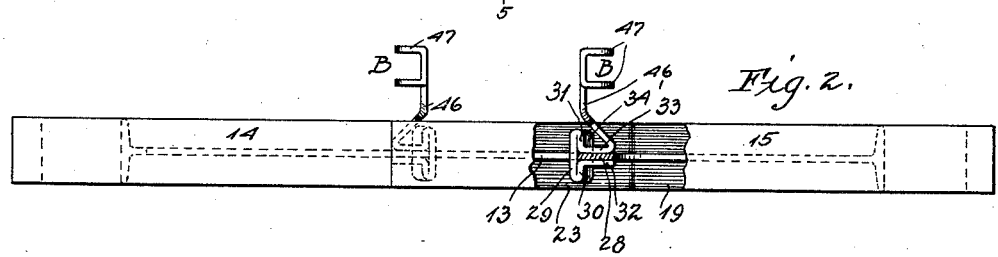
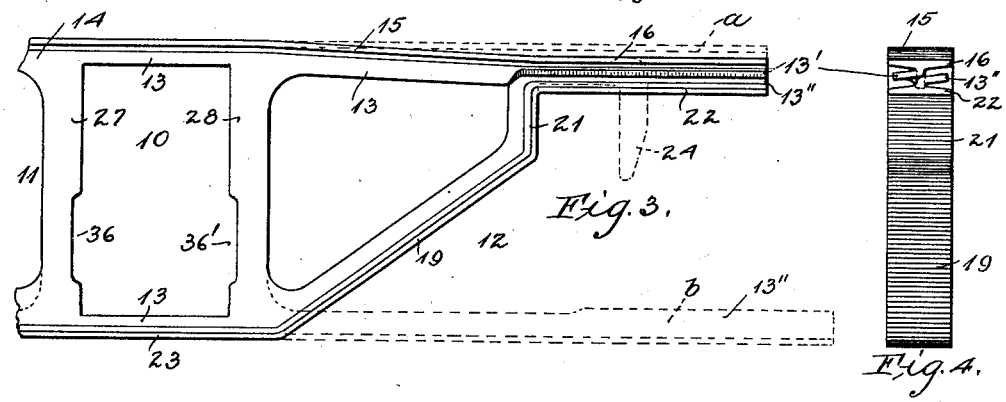
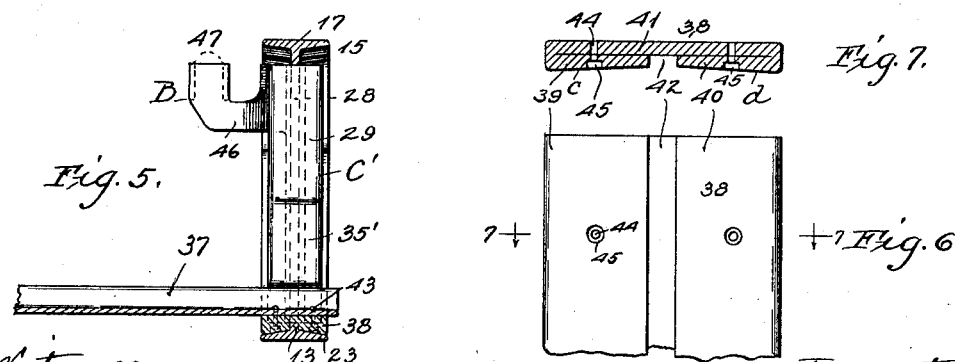
Witnesses:
Charles J. Schmitt
Nellie B. Dearborn
Inventor:
Alonzo L. Hastings
By Offield, Towle, Graves & Offield
Atty's.
COLUMBIA PLANOGRAPH CO., WASHINGTON, D. C.

UNITED STATES PATENT OFFICE.

ALONZO L. HASTINGS, OF CHICAGO, ILLINOIS.

TRUCK-FRAME.

1,006,549.

Specification of Letters Patent.

Patented Oct. 24, 1911.

Application filed November 28, 1910. Serial No. 594,446.

*To all whom it may concern:*

Be it known that I, ALONZO L. HASTINGS, a resident of Chicago, in the county of Cook and State of Illinois, have invented certain new and useful Improvements in Truck-Frames, of which the following is a specification.

My invention relates to truck frames and involves important features of construction and arrangement over those disclosed in my Patent No. 936,626, dated October 12, 1909. As disclosed in this patent the truck frame body is formed up from an I-beam from which sections of the web are punched out and the ends brought together and secured together. As disclosed in this patent the end sections of the remaining web parts are almost entirely cut away, which is apt to leave a deficiency of metal in the parts which eventually support the journal boxes. Furthermore, as the construction shows, the journal boxes must be secured to the truck frame as by means of bolts. In the arrangement of the patent also, before the bolster can be applied to the truck frames the chafing plates must be removed and then slipped in afterward and then bolted in place. The brackets for supporting brake mechanism are also secured by bolts, and bolts are of course undesirable in railway structures.

One of the important objects of my invention is therefore to provide a construction and arrangement which will allow for sufficient metal for forming the journal box supporting ends and for providing for better distribution of the metal during welding together of the ends of the punched out beam.

Another important object is to increase the length of the beam ends and to weld them together and to shape them to form supporting pockets for rigidly and securely receiving and holding the journal boxes without the use of bolts.

Another important object is to provide a form of chafing frames which can be permanently applied, preferably by welding, when the truck frame is constructed, so as to eliminate bolts and to allow the bolster to be applied to the truck frame when the chafing frames are in permanent position thereon.

Another important improvement is to constitute the frame mechanism supporting brackets as integral parts of the chafing frames, each chafing frame at its bracket being preferably stamped and formed integrally from sheet metal, thus effecting a further elimination of bolts.

Another object is to provide a form of spring plank supporting block, the block being preferably shaped integrally from sheet metal to snugly and securely fit over the lower flange of the truck frame.

In the accompanying drawings which fully illustrate the various improvements of my invention Figure 1 is a side elevational view of a truck frame, Fig. 2 is a top view thereof, a section being broken away to more clearly illustrate the chafing frame arrangement, Fig. 3 shows the greater part of a truck frame at an intermediate stage of its construction, Fig. 4 is an end elevational view of the arrangement shown in Fig. 3, Fig. 5 is a sectional view taken on plane 5—5, Fig. 1, Fig. 6 is an under side view of a spring plank supporting block, and Fig. 7 is a sectional view taken on plane 7—7, Fig. 6.

The frame proper is formed from an ordinary I-beam which has a central section of its web punched out to leave a central substantially rectangular opening 10 and which has the end sections of the web cut away to leave the end openings 11 and 12, this being illustrated by the dotted lines $a$ and $b$ in Fig. 3. In order to strengthen the structure the narrow sections 13 of the web are left. After the punching operation the intermediate sections 14 and 15 of the top ends are given a slight downward deflection, while the end sections 16 and the middle sections 17 are kept horizontal. The intermediate lower sections 18 and 19 are given a more abrupt upward deflection, the sections 20 and 21 are bent further to become vertical, and the end sections 22 are bent to remain horizontal. The middle section 23 also remains horizontal. During these bending operations or thereafter the sections 13' and 13'' of the webs along the horizontal parts 16 and 22 are bent over in opposite directions toward their respective flanges, as illustrated best in Fig. 4. The parallel ends 16 and 22 are now heated and put under the hammer, so that the flanges and the interposed bent-over web sections 13' and 13'' are welded together to make a solid end of rectangular cross section, the web sections 13' and 13'' by being bent over into position between the flange ends giving more metal and a much better distribution thereof, so that welding can be more readily and efficiently accomplished. The end sections 24 of the welded-together ends are now bent downwardly into vertical position parallel with and adjacent the respective vertical sections 20 and 21 of the frame, so as to provide rectangular pockets 25 and 26 for receiving the journal boxes, the journal boxes fitting in to these pockets and being securely held therein without the need of bolts or other additional fastening means. To allow for the greater amount of bending of the lower sections $b$ of the punched I-beam, these sections are primarily longer than the sections $a$, as indicated by dotted lines in Fig. 3.

The vertical web sections 27 and 28 adjacent the central compartment 10 serve to support chafing frames designated as a whole C and C'. These chafing frames are of substantially T-shape and bent up integrally from sheet material. As best shown in Fig. 2, each frame comprises a front section 29, the sections 30 and 31 bent abruptly back against the front part 29, and the sections 32 and 33 extending perpendicularly from the front part 29 but separated a distance to receive a web section 27 or 28. These frames are slipped on to their respective web sections and then permanently secured to the web sections preferably by being spot welded thereto, the frames abutting at their upper and lower ends against the respective web sections 13. The bolsters which will be used with this form of frame have side grooves for receiving the adjacent heads of the chafing frames, and in order that a bolster may be applied to opposite truck frames when the chafing frames are in permanent position thereon these chafing frames are offset at 34 and 34' adjacent their lower ends a distance equal to the height of the bolster to form opposite pockets or channels 35 and 35' into which the ends of the bolster are first inserted, whereafter the bolster can be raised to bring its grooves into dove-tail engagement with the upper ends of the chafing frame heads. The offsets in the chafing frames can be readily provided therein during formation of these frames, and in order to accommodate the offset sections the web sections 27 and 28 may have recesses 36 and 36', as best shown in Fig. 3.

The bolster is usually supported on springs and held thereby in the upper part of the compartments 10 of the truck frames, and in order to support these springs a channel beam 37 is applied at its ends on the lower sections 23 of the truck frames. In order to form a secure seat for the channel beam a block 38 is interposed between each end thereof and the corresponding section 23. Each block is preferably shaped as illustrated in Figs. 6 and 7, and bent up from a sheet metal plate of suitable thickness whose side sections 39 and 40 are bent up against the central section 41, the bent structure being preferably put under the hammer while hot, and the lower surfaces $c$ and $d$ of the parts 39 and 40 given a taper to fit the taper of the flange to which the block is applied. The ends of the sections 39 and 40 also fall short to leave the pocket 42 for receiving the web section 13 left on the flange to which the block is to be applied. As best shown in Fig. 5, each block is secured to the channel beam 37 by means of rivets 43, these rivets passing through holes 44 formed in the block, and the block being also countersunk as shown at 45 to keep the rivet heads away from the flanges engaged by the block, so that the block will seat snugly and securely. With this arrangement the spring plank need not be positively secured to the truck frames by bolts, rivets or otherwise, the hooking engagement of the blocks 38 over the web sections 13 serving to rigidly lock the spring plank to the frames so that the plank will transversely brace the truck frame at its lower end. In practice, suitable springs are interposed between the channel beam 37 and the bolster and will serve to retain the bolster between the upper ends of the chafing frames and to retain the beam 37 in locking engagement with the lower flange parts of the truck frames.

As shown in Figs. 2 and 5, each chafing frame has an extension integral therewith to form a bracket B for supporting brake mechanism. The upper end of the side section 33 of each bar has the extension 46 bent at an angle therewith and then outwardly, sections of this extension being bent at right angles therewith to form ears 47 between which brake supporting members can be pivoted. Each bracket therefore forms an integral part of a chafing frame which can be stamped and formed from sheet metal, and the chafing frames being permanently welded to their supporting web sections when the truck frame is constructed, all bolts are eliminated, and the chafing frames become practically integral parts of the main truck frames. The welding together of the frame ends with ample supply of metal and the formation of the ends, as shown, will provide pockets for the journal boxes for locking these boxes to the frame without the need of bolts or other extraneous parts. The vertical sections 20 and 21 of the frame, besides forming sides of the journal box pockets, also add greatly to the strength and rigidity of the frames. The various details of construction and arrangement are therefore decided improvements over the construction and arrangement disclosed in my patent referred to. I do not desire to be limited, however, to the precise construction and arrangement shown and described herein, as changes and modifications are possible which would still come within the scope of the invention.

I therefore claim the following:

1. A truck frame comprising an I-beam having the web sections at its ends cut away and the flange ends brought intimately together and secured together and bent to form pockets for receiving journal boxes.

2. A truck frame formed of an I-beam section having the web adjacent its ends cut away and the ends brought together and welded together and bent to form pockets for receiving journal boxes.

3. A truck frame having a main or body portion formed of an I-beam having the central portion and end portions of its web removed, the remaining ends of the beam at each end being deflected toward each other and welded together part way and then bent to form pockets for receiving journal boxes, and chafing frames permanently secured to the remaining web sections.

4. In a truck frame, the combination of a body part comprising upper and lower flanges and two vertical parallel connecting webs connecting said flanges, a chafing frame bent up of sheet metal into substantially T-form and surrounding each of said webs, the opposed faces of said chafing frames being offset inwardly adjacent their lower ends to allow insertion of a bolster between said plates.

5. In a truck frame, the combination of a body part comprising upper and lower flanges and two vertical parallel connecting webs connecting said flanges, a chafing frame bent up of sheet metal in substantially T-form and surrounding each of said webs, the opposed faces of the chafing frames adjacent their lower ends having transverse pockets or channels formed therein, said webs being correspondingly recessed to receive said pockets.

6. In a truck frame, the combination of a body part comprising upper and lower longitudinal flange members and two parallel intermediate web members connecting said longitudinal members, a chafing frame for each web member bent from sheet metal into substantially T-form to substantially surround the web member, the heads of said chafing frames being opposed to each other and offset outwardly a distance adjacent their lower ends to form opposed transverse ridges or pockets, said web members being correspondingly recessed to receive the offset portions of the chafing frame, and a bracket for each chafing frame formed integral therewith.

7. In a truck frame, the combination of a body part comprising upper and lower longitudinal members and two vertical connecting members placed adjacent each other inwardly of the ends of the longitudinal members, and a spring plank supporting block mounted on the lower longitudinal member between the vertical connecting members and bent up integrally of sheet metal.

8. In a truck frame, the combination of a body part formed of an I-beam having its central web section cut away to leave a rectangular opening and having the end portions of its web cut away to leave end openings, the upper and lower flange sections adjacent each end opening being bent and secured together to form a support for journal boxes, two vertical web sections remaining between the central opening and the end openings to form transverse supporting members for the body part, a chafing frame welded to each supporting member, and a spring plank supporting block engaging the lower beam flange between the transverse supporting members and shaped integrally of sheet material to accurately fit the contour of said lower beam flange.

9. In a truck frame, the combination of a body part formed of an I-beam having its central web section cut away to leave a rectangular opening and having the end portions of its web cut away to leave end openings, the upper and lower flange sections adjacent each end opening being bent and secured together to form a support for journal boxes, two vertical web sections remaining between the central opening and the end openings to form transverse supporting members for the body part, a chafing frame welded to each supporting member, a spring plank supporting block engaging the lower beam flange between the transverse supporting members and shaped integrally of sheet material to accurately fit the contour of said lower beam flange, and a supporting bracket for brake mechanism formed integral with each chafing frame.

10. A truck frame formed of an I-beam having the end sections of its web cut away to within a short distance of the beam flanges, the remaining web sections adjacent the ends of said flanges being bent over toward said flanges and the flanges adjacent said bent-over web sections being welded together.

11. A truck frame formed of an I-beam having the end sections of its web cut away to within a short distance of the beam flanges, the remaining web sections adjacent the ends of said flanges being bent over toward said flanges and the flanges adjacent said bent-over web sections being welded together, and then bent to form rectangular pockets for receiving journal boxes.

12. The process of constructing the end portions of truck frames, which consists in cutting out the web portions of an I-beam between the opposed ends of the beam flanges and to within a short distance of the flanges, then deflecting over and in opposite directions the remaining web portions along the end sections of the opposed flanges, then bringing together and into parallel relation the flange sections along which the web portions have been bent over, and then welding together these parallel flange sections and the interposed bent-over web sections.

In witness hereof, I hereunto subscribe my name this 23rd day of November, A. D. 1910.

ALONZO L. HASTINGS.

Witnesses:
CHARLES J. SCHMIDT,
NELLIE B. DEARBORN.

Copies of this patent may be obtained for five cents each, by addressing the "Commissioner of Patents, Washington, D. C."